March 8, 1960 W. M. SCHWEICKART 2,927,480
DIFFERENTIAL DRIVE
Filed Jan. 24, 1957 6 Sheets-Sheet 1

INVENTOR.
WILLIAM M. SCHWEICKART
BY
Frank A. Bower
ATTORNEY

March 8, 1960 W. M. SCHWEICKART 2,927,480
DIFFERENTIAL DRIVE
Filed Jan. 24, 1957 6 Sheets-Sheet 3

INVENTOR.
WILLIAM M. SCHWEICKART
BY
Frank G. Bower
ATTORNEY

United States Patent Office 2,927,480
Patented Mar. 8, 1960

2,927,480

DIFFERENTIAL DRIVE

William M. Schweickart, Mentor, Ohio

Application January 24, 1957, Serial No. 636,110

12 Claims. (Cl. 74—650)

This invention relates to the differential drive mechanisms.

The main object of the invention is to provide a differential drive that varies the relative speed of the wheels and also applies torque to one wheel when the other wheel loses traction.

Another object is to provide a differential drive that is inexpensive to manufacture.

The following description of the differential drive embodying the invention is made in connection with the figures in the accompanying drawings in which—

As illustrated in Figs. 1-4, the wheels 12 and 13 are driven through a differential drive mechanism varying the relative speeds of the wheels in response to the variations of torque applied to the wheels. The wheels 12 and 13 are rotatably mounted on opposite ends of an axle 25 secured to the vehicle frame represented by the slanted lines.

The differential drive comprises generally compound sheaves 17 and coupling mechanisms 14 and 15 separately connecting the compound sheaves to a respective wheel. The coupling mechanisms 14 and 15 are pivotally mounted to rotate in response to the variations in torque applied to the wheels so that the speed of the wheels varies with the torque applied to them and varies the speed relation between the wheels on application of different torques to the wheels. The compound sheaves 17 are connected to the coupling mechanisms 14 and 15 to vary the speed relation between the compound sheaves and the coupling mechanism.

The compound sheaves 17 are mounted on and rotated by the input shaft 16 connected directly or through a control mechanism to a power source. A speed control mechanism 11 is shown in Figs. 3 and 5-7. The compound sheaves comprise a fixed sheave member 18, an intermediate sheave member 19 and an end sheave member 20. The sheave members have sloped surfaces to form two V-shaped grooves for receiving the flexible V-belts 29 and 33, respectively. The intermediate sheave member 19 and the end sheave member 20 slide axially along the shaft 16 to vary the pitch diameters of the V-shaped grooves. The slidable sheaves are moved axially under the pressure of the belts and a helical spring 21. The helical spring 21 is seated in a collar 22 fixed to and rotating with the shaft 16. The spring presses against the sheave member 20 to force the sheave member 20 and the intermediate sheave member 19 toward the fixed sheave 18 to increase the pitch diameter of the grooves 62 and 63.

The wheel 12 is connected to the compound sheave 17 by the coupling mechanism 14 and wheel 13 is connected by coupling mechanism 15. The coupling mechanism 14 comprises fixed sheaves 28, jackshaft 26, sprocket gear 30, chain 31, and sprocket wheel 23. The coupling mechanism 15 comprises fixed sheave 32, jackshaft 27, sprocket gear 34, chain 35, and sprocket wheel 24. The coupling mechanisms are pivotally mounted by linkage means 45 and 46, respectively, to rotate the coupling mechanisms about the axle 25 so that the fixed sheaves 28 and 32 move in an arc to and from the compound sheaves 17 to vary the speed relation between the input shaft 16 and the jackshafts 26 and 27. The jackshafts 26 and 27 are rotated so that the wheels 12 and 13 are rotated in the same direction and roll the wheels in the direction indicated by the large arrows.

Figure 1:
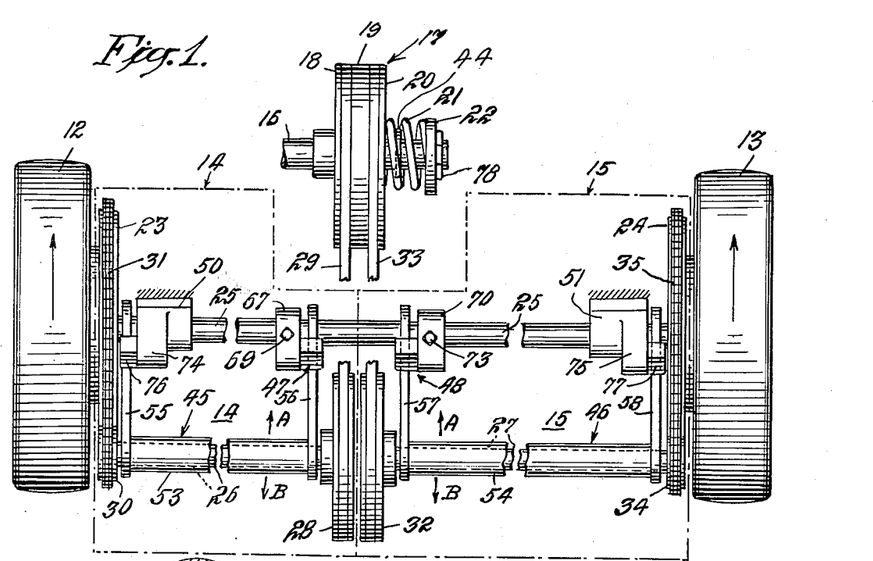
Fig. 1 is a top view illustrating the differential drive with the compound sheave separated from the remainder of the drive.

The rotational torque of the jackshafts 26 and 27 causes the sprocket gears 30 and 34 to rotate the jackshafts 26 and 27 about the axle 25 in a direction indicated by the arrow B (Fig. 1). The direction of swing is limited by the compound sheaves 17. With a low torque on the wheels 12 and 13 the spring 21 forces the intermediate sheave 19 and the spring loaded sheave 20 toward the fixed sheave 18 to increase the pitch diameter of the grooves. On an increase in torque the jackshafts 26 and 27 are rotated in the direction B, pulling the belts down into the grooves of the compound sheave against the pressure of the spring 21 and decreasing the pitch diameter of the grooves. On a lessening of the torque, the jackashafts 26 and 27 move in direction A (Fig. 1) under the pressure of the spring 21. The movement in direction A is limited by the stop means 47 and 48.

Figure 2:
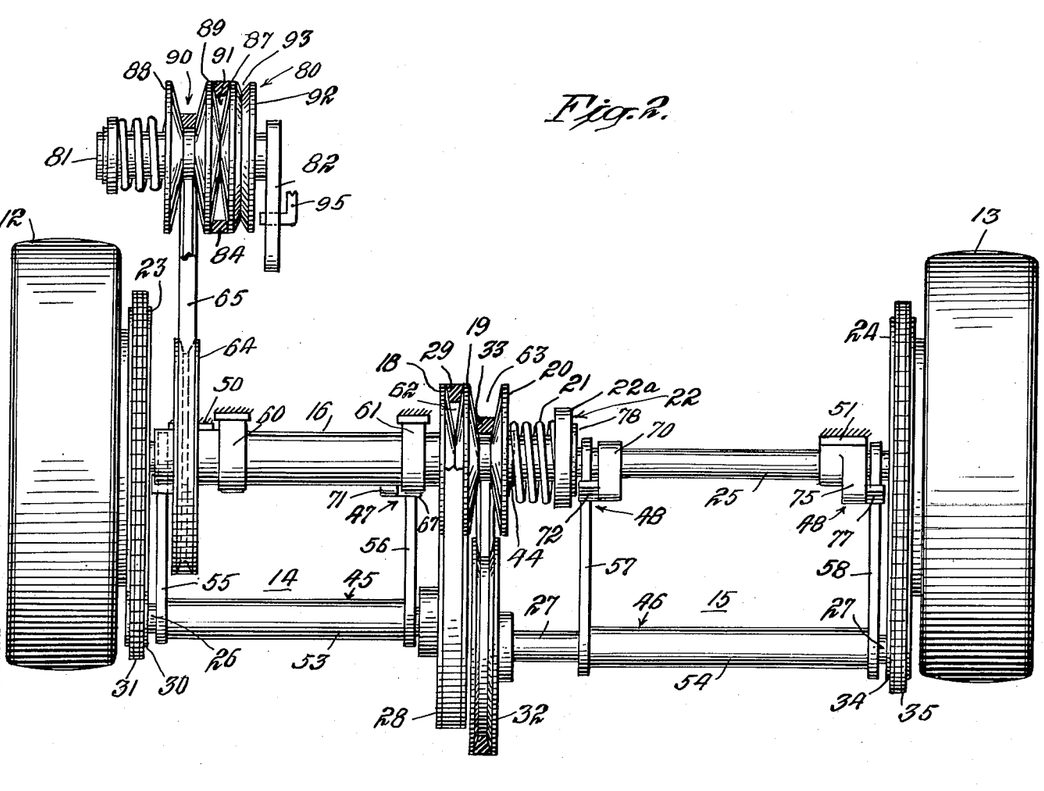
Fig. 2 is a top view of the differential drive.
Figure 3:
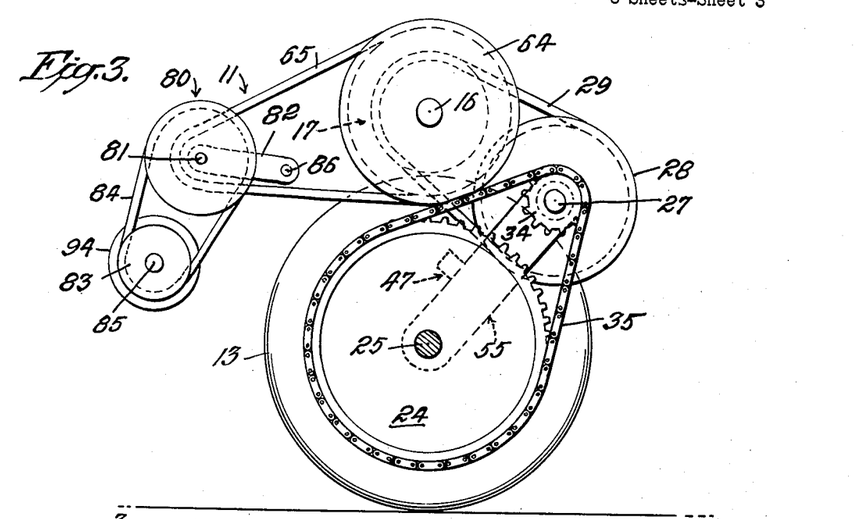
Fig. 3 is an end view taken from line 3—3 over to line 13—13 of Fig. 4.
Figure 4:
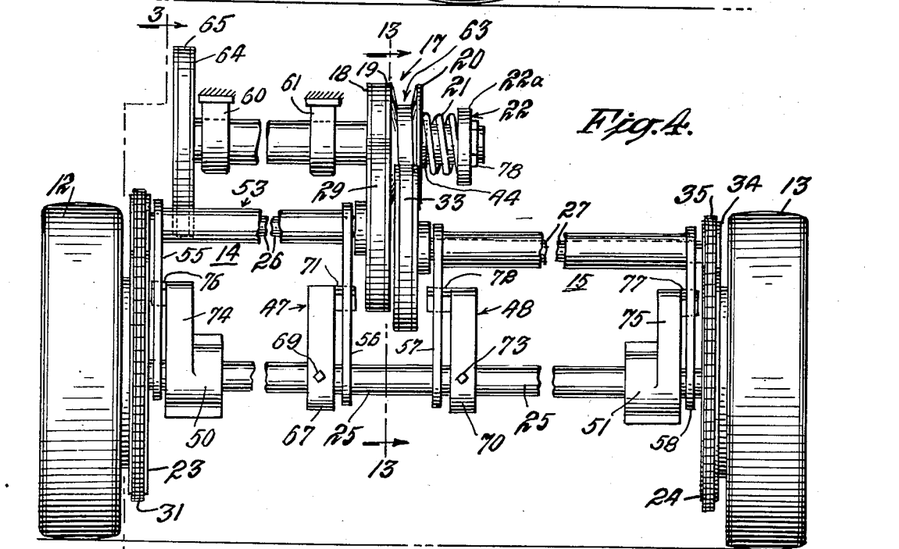
Fig. 4 is a rear view illustrating the wheel and wheel gear in section.
Figure 5:
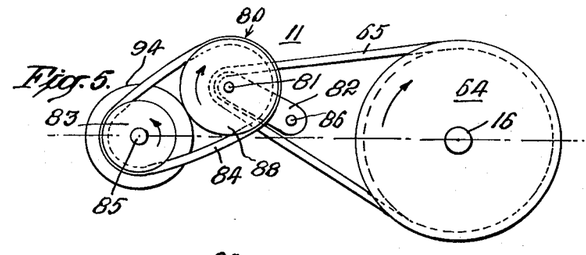
Figs. 5-7 diagrammatically illustrate the speed control and reversing mechanism.
Figure 6:
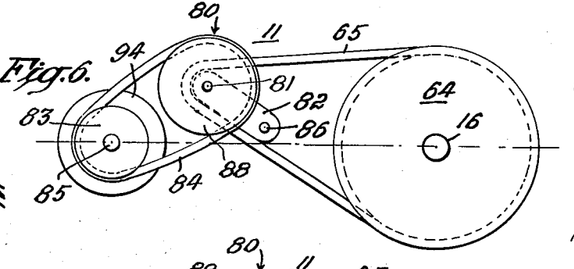
Figure 7:
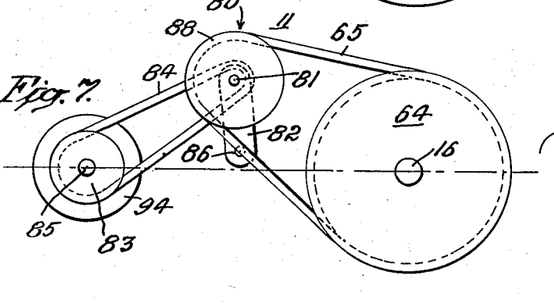

As shown in Figs. 1, 2 and 4, a snap ring 44 is fitted in a circumferential groove in the shaft 16 to limit the axial spread of the sheave members. In this embodiment the compound sheaves are limited so that the belts 29 and 33 can only move one-half the pitch diameter of the grooves 62 and 63 at the same time. When belt 33 moves to the minimum pitch diameter, belt 29 must move to the maximum pitch diameter and, similarly, when belt 29 moves to the minimum pitch diameter, belt 33 must move to the maximum pitch diameter. Thus, when the compound sheaves are at the maximum axial spread, the belts 29 and 33 vary inversely to one another. For example, if the coupling mechanism 14 is against the stop means 47 and at the maximum pitch diameter and the coupling mechanism 15 is at the minimum pitch diameter, an increase in torque to the wheel 12 will result in a movement inwardly of the belt 29 in the groove 62 and a movement outwardly of the belt 33 in the groove 63. This is the preferred form of the compound sheaves of the differential drive.

The jackshafts 26 and 27 respond to the torques on the respective wheels 12 and 13. If the torque applied to wheel 12 decreases, the jackshaft 26 rotates in direction A and if the torque applied to wheel 13 decreases, the jackshaft 27 moves in direction A. On the turning of the wheels so that wheel 13 covers a shorter distance than wheel 12, the torque on wheel 13 increases and the torque on wheel 12 decreases. Under these conditions the jackshaft 26 moves in direction A and the jackshaft 27 moves in direction B. The speed relation between the fixed sheave 28 and the compound sheaves 17 increases, rotating wheel 12 at a greater speed, and the speed relation of the compound sheaves 17 and the sheave 32 decreases, rotating the wheel 13 at a lower speed, so that wheel 12 will cover a greater distance than wheel 13 in the same period of time. At the same time, the torque applied to wheel 12 decreases and the torque applied to wheel 13 increases.

If, for example, the traction of wheel 12 should decrease to zero, the jackshaft 26 would move in direction A against the stops 47. However, power is still applied to wheel 13 and with the reduction in traction on wheel 12, wheel 13 increases in back torque, since it is assuming the entire load, and jackshaft 27 would move in direction B. Thus, the differential drive mechanism responds to rotate the wheels at different speeds on a turn and to apply a torque to the wheel with good traction when the other wheel is without traction.

Figure 8:
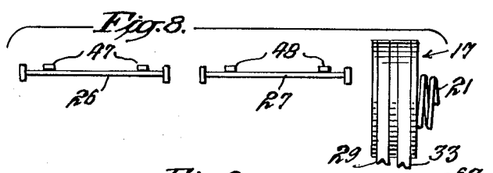
Figs. 8-12 diagrammatically illustrate the relation between the positions of the coupling mechanisms and the compound sheaves.
Figure 9:
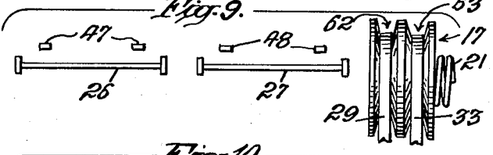

In Figs. 8–11 the relationship of the position of the jackshafts 26 and 27 and the pitch diameters of the grooves of the compound sheaves 17 is illustrated. In Fig. 8 both of the jackshafts are against the respective stop means and the grooves are at their maximum pitch diameters. This condition occurs when the vehicle is under a light load and moves along a straight path. If the load is increased, such as while moving up an incline, the torque on the wheels increases and the sprocket gears 30 and 34 rotating against the chain, swing the jackshafts 26 and 27 in direction B and pull the belts 29 and 33 deeper into the grooves, thus decreasing the pitch diameters. The intermediate sheave member 19 and the end sheave member 20 compress the spring 21, which balances the force of the belts in the grooves. The movements of the jackshafts 26 and 27 are limited by the resiliency of the spring 21 and by the distance through which the slidable sheaves may be operated. When the torque of the wheels is reduced, the pitch diameter of the grooves returns to the position illustrated in Fig. 8.

Figure 10:
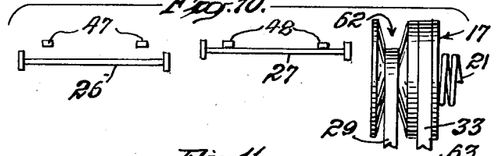
Figure 11:
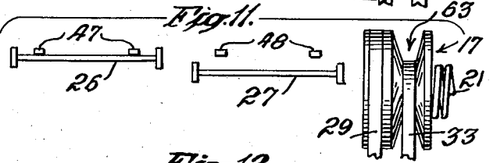

In Figs. 10 and 11 the positions of the compound sheaves for left and right turns are illustrated. In Fig. 10 the wheel 13 covers a greater distance and the inside wheel 12 covers a shorter distance. The traction on wheel 12 is increased, whereas the traction on wheel 13 is decreased. As a result, the torque applied through the jackshaft 26 is increased and the torque applied through the jackshaft 27 is decreased. The jackshaft 26 then rotates further in direction B to reduce the pitch diameter of the groove of the compound sheave, thereby reducing the speed of wheel 12 to accommodate it to the shorter distance traveled. The jackshaft 27 moves in direction A to increase the pitch diameter of the groove of the compound sheaves, thereby increasing the speed of wheel 13.

In Fig. 11 the movement of the jackshafts 26 and 27 increases the speed of wheel 12 for the greater distance traveled and decreases the speed of wheel 13 for the lesser distance traveled in response to the torques applied to the wheels.

Figs. 10 and 11 also illustrate the relationship of the jackshafts and the pitch diameters of the grooves of the compound sheaves when there is a difference in traction between the wheels 12 and 13. In Fig. 10 a reduction in traction of the wheel 12 causes a reduction in the application of torque to the wheel and a movement of jackshaft 27 and linkage means 46 against the stop means 48. Wheel 12 then assumes the load of the vehicle and the torque applied to the wheel correspondingly increases, moving jackshaft 26 in direction B. In Fig. 11 the reverse condition is illustrated when wheel 12 loses traction and wheel 13 assumes the driving load.

Figure 12:
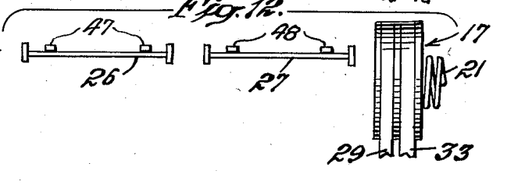
Figure 13:
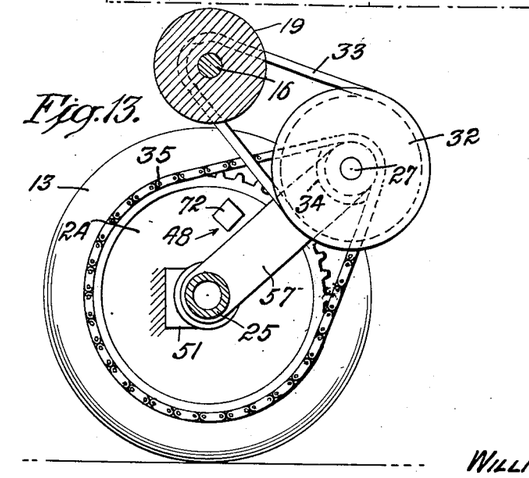
Fig. 13 is a sectional end view taken along lines 13—13 of Fig. 4.

Figs 11 and 12 illustrate the operation of the jackshafts 26 and 27 and the compound sheaves for a forward motion of the vehicle. In Fig. 12 the position of the jackshafts and compound sheaves is illustrated for a rearward motion. The vehicle is reversed in direction by reversing the rotation of the shaft 16. Under such a condition the torque applied to the jackshafts 26 and 27 is reversed and the sprocket gears 30 and 34 rotate the jackshafts 26 and 27 and the respective linkage means 45 and 46 against the stop means 47 and 48. The grooves of the compound sheaves then move to the greater pitch diameter position and the vehicle moves in a rearward direction. Under the rearward operation there is no relative movement of the jackshafts 26 and 27, since the rotational torque of the sprocket gears 30 and 34 and the pressure of the spring 21 are operating in the same direction to force the compound sheaves into the maximum pitcher diameter position.

In Fig. 2 a detailed illustration of an embodiment of the invention is shown in which the axle 25 is secured to the frame by the supports 50 and 51 to transmit the weight of the vehicle to the wheels 12 and 13. The sprocket wheels 23 and 24 are rigidly secured to the wheels 12 and 13, respectively, to rotate the wheels. The wheels are rotatably mounted and fastened on the axle 25 in a suitable manner.

The linkage means 45 and 46 pivotally supporting the jackshafts 26 and 27 comprise tubular members 53 and 54 rotatably supporting jackshafts 26 and 27 and links 55, 56, 57 and 58. The tubular members extend a substantial length of the jackshafts 26 and 27 to support the jackshafts in parallel relation with the axle 25. The links 55, 56, 57 and 58 are rotatably mounted on the axle 25 so that the tubular members 53 and 54 freely swing in a designated arc about the axle 25. The sprocket gears 30 and 34 are rigidly connected to the jackshafts 26 and 27, respectively, to be rotated thereby, and the fixed sheaves 28 and 32 are positioned adjacent to one another at the opposite ends of the jackshafts 26 and 27 from the sprocket gears 30 and 34. Fixed sheaves 28 and 32 have V-shaped grooves for receiving the V-shaped flexible belts 29 and 33, respectively. The sprocket gears 30 and 34 are connected by the flexible chains 31 and 35 to the sprocket wheels 23 and 24, respectively. The sprocket wheels 23 and 24 have a substantially larger diameter than the sprocket gears 30 and 34 to reduce the speed of the wheels in relation to the jackshafts 26 and 27.

The input shaft 16 is rotatably mounted in the fixed bearings 60 and 61 secured to the frame so that the shaft 16 rotates about the fixed axis. The spring loaded compound sheaves 17 are mounted on the shaft 16 to rotate about the fixed axis of the shaft 16. In this embodiment the sheave members 18, 19 and 20 have sloped surfaces to from V-shaped grooves 62 and 63. The sheave members are keyed to the shaft 16 and are driven thereby. The sheave member 18 is longitudinaly fixed on the shaft 16 in a suitable manner and the intermediate sheave member 19 and the end sheave member 20 are mounted to axially slide along the shaft 16. A collar 22 is secured on the shaft 16 and has a flange 22a for receiving and seating a helical spring 21 bearing against the end sheave 20 to press the sheave members 19 and 20 towards the fixed sheave member 18, thus increasing the pitch diameter of the grooves 62 and 63 against the pressure of the belts 29 and 33. The shaft 16 has a fixed sheave 64 secured thereto in a suitable manner to rotate the shaft 16. The fixed sheave 64 is connected to the control mechanism 11 by means of a V-belt 65.

Stop means 47 and 48 may be mounted in a suitable manner to limit the rotation of the linkage means 45 and 46 towards the compound sheaves 17. In Figs. 1 and 2 the stop means may be mounted on the supports 50 and 51 and on collars 67, 70. The supports 50 and 51 have arms 74 and 75 supporting fingers 76, 77 engaging links 55 and 58. The other links 56, 57 engage fingers 71, 72 mounted on collars 67 and 70 secured on the axle 25. The collars 67 and 70 may have set screws 69, 73, respectively, for securing the collars in place on the axle 25. The end of the shaft 16 may be threaded to receive a nut 78 bearing against the collar 22 to vary the compression of the spring 21. The stop means 47 and 48 and the nut 78 may be adjusted to limit the arc of rotation of the tubular members 53 and 54. The sheave members 19 and 20 may be varied so that the pitch diameters of the grooves 62 and 63 will provide a speed relation between the wheels 12 and 13 in order that a substantially sharp turn may be made by the wheels 12 and 13 while still maintaining the wheels in a rolling relation to the traction surface.

The control mechanism 11 comprises a compound sheave 80 rotatably mounted on a shaft 81 secured to a link 82 rotatably connected to the frame by the pivot 86 at the end opposite from the shaft 81 so that the shaft 81 swings in an arc. The fixed sheave 64 is coupled to the compound sheave 80 by the belt 65 to be driven by the compound sheave over a wide range of speeds. The compound sheave 80 is connected to engine sheave 83 by belt 84. The engine sheave 83 is mounted on a drive shaft 85 connected to a suitable prime mover, such as a gasoline engine.

The compound sheave 80 comprises a fixed end sheave member 87, an intermediate sheave member 89 and a spring loaded end sheave member 88. The intermediate member and the spring loaded end sheave member are axially slideable on the shaft 81. The sheave members have sloped surfaces to form V-shaped grooves 90 and 91 variable in pitch diameter on movement of the shaft 81 about the pivot 86. The belt 65 fits in the groove 90 and the belt 84, connected to the engine sheave 83, fits in the groove 91. The fixed sheave member 87, forming one side of the groove 91, has an extended rim 92 with a circumferential V-shaped groove 93. The engine sheave 83 has a complementary V-shaped edge 94 extending radially beyond the sheave member 83 to fit in the groove 93. In order to reverse the direction of rotation of the compound sheaves and thereby the direction of rotation of the shaft 16, the compound sheaves are pivoted so that the edge 94 engages the groove 93.

The arm 82 may be actuated in any suitable manner, such as by shaft 95 pivotally secured to the arm 82 and extending to a convenient location for the operation of the compound sheaves 80. The rod 95 forces the compound sheaves against the edge 94 and holds it in engagement by a suitable mechanism (not shown). The pivot 86 is positioned between the shafts 16 and 85, preferably a short distance from a line through the centers of the shafts 16 and 85. The link 82 and compound sheaves 80 are on the same side of the line and the spacing of shaft 81 and pivot 86 and the diameter of the edge 95 is such that over the speed range the compound sheaves 80 are moving to and from the motor sheave 84 and the driven sheave 64. The pivot 86 is positioned to be generally in line with the shaft 81 and the shaft 16 so that at the extreme end of the arc of travel of the shaft 81 over the variable speed range, the shaft 81 is moving generally circumferentially to the shaft 16 so that the belt 65 does not move to a smaller pitch diameter. The diameters of the groove 93 and the edge 94 are such that the groove and the edge are brought into engagement and the direction of rotation of the compound sheaves 80 will be reversed. Since the shafts 81 and 85 are close together, the belt 84 will hang loosely and will not deliver any power to the compound sheaves 80. Thus, by placing the pivot 86 slightly to one side of the lines through the shafts 16 and 85 and on the same side as the pivot 81, the compound sheaves 80 may be moved through a variable speed range generally to and from the fixed sheaves 64 and 83. This is the low speed end. At this end the shaft 81 moves generally circumferentially and since the belt 84 is loose, no speed variation results except the reversal in rotation by the engagement of groove 93 and edge 94.

Although in the foregoing embodiment it is preferable for a smooth operation to spring load the sheave 20, the differential drive operates satisfactorily in the forward direction without the resilient means. The sheaves 18 and 20 are fixed and the intermediate sheave 19 is slideable. On equal torques the belts 29 and 33 are at a mid-position and shift in inverse direction on a change in the difference in the torque between the two traction wheels. However, in reverse the resilient means is required for adequate transmission of power. The pressure of the resilient means determines the power transmitted.

Figures 14, 15:
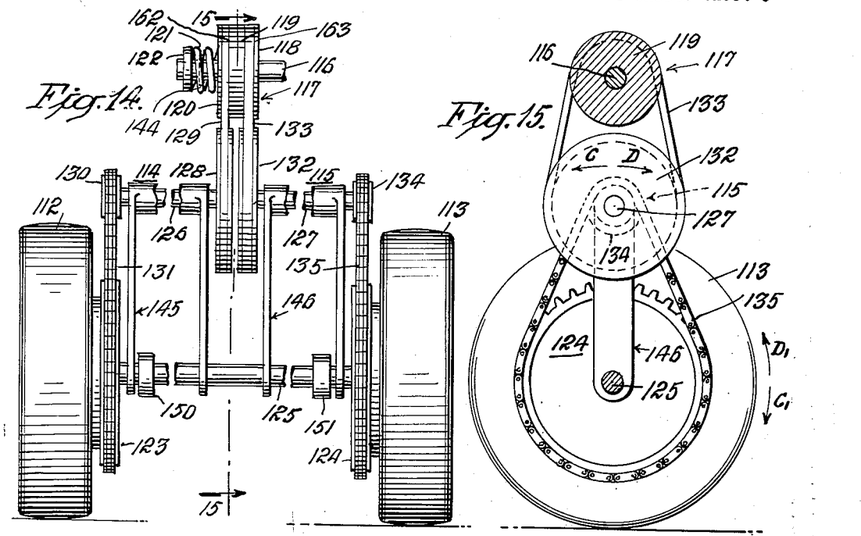
Fig. 14 is a front view of an embodiment of the invention in which differential action occurs on the rotation of the wheels in either direction.
Fig. 15 is a sectional view taken along lines 15—15 of Fig. 14.
Figure 16:
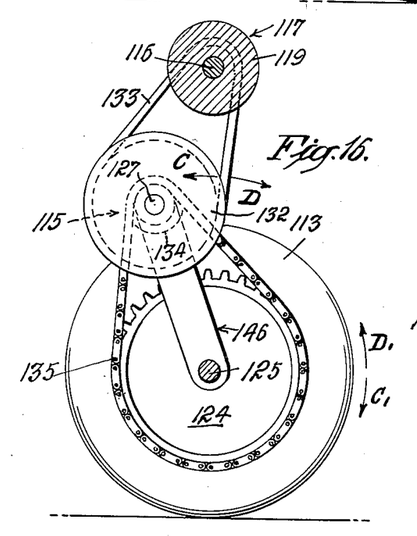
Figs. 16 and 17 illustrate various positions of the operative elements.
Figure 17:
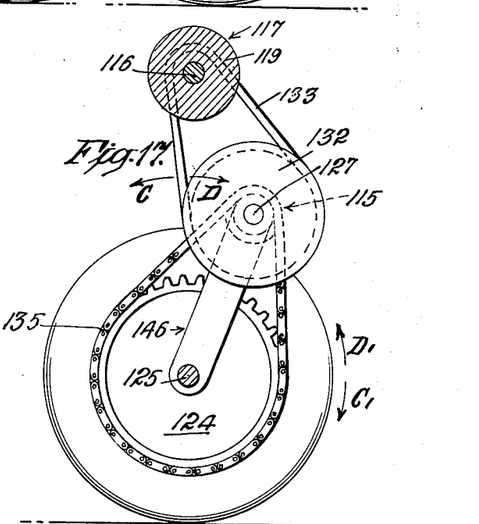

Another embodiment of the invention is shown in Figs. 14 and 15 in which the differential drive mechanism functions when the wheels are driven in either direction. The components are the same as in the previous embodiment, except that the stop means are omitted and the coupling mechanisms are positioned between the compound sheaves and the axle.

The wheels 112 and 113 are rotatably mounted on the axle 125. The axle 125 is secured to the vehicle frame by the supports 150 and 151. The linkage means 145 and 146 of the coupling mechanisms are pivotally mounted on the axle 125 to rotate the jackshafts 126 and 127 about the axis of the wheels 112 and 113. The jackshafts 126 and 127 have fixed sheaves 128 and 132 on adjacent ends and have sprocket gears 130 and 134 mounted on the other ends of the shafts. The sprocket gears are connected to the sprocket wheels 123 and 124 by means of the chains 131 and 135. Thus, the sprocket gears will tend to rotate the respective coupling mechanisms about the axle 125 on an increase of torque to the wheels. The fixed sheaves are coupled to the compound sheaves 117 by the belts 129 and 133, respectively. The compound sheaves 117 are spaced from the axle 125 to permit the coupling mechanisms with the fixed sheaves 128 and 132 to swing freely between the fixed sheaves and the axle. The compound sheaves 117 are mounted on the input shaft 116 which may be suitably supported to rotate about a fixed axis and which may be connected to a suitable speed control mechanism or directly to a suitable power source. The compound sheaves 117 comprise a sheave 118 fixed to the shaft 116, an intermediate slideable sheave 119 and an end slideable sheave 120. A resilient means, such as helical spring 121, is mounted in a collar 122 and presses axially against the sheave member 120 to force the sheave members together and increase the pitch diameter of the grooves 162 and 163. The pressure of the spring, therefore, tends to shorten the distance between the axis of the shaft 116 and the jackshafts 126 and 127. As in the previous embodiment, it is preferable to provide a stop means 144 in the form of a snap ring on the shaft 116 to limit the simultaneous inward movement of the belts to one-half the distance between the top and bottom of the grooves 162 and 163. Thus, in a loaded condition the pitch diameters of the grooves 162 and 163 vary inversely.

The coupling mechanisms may swing on either side of a center line passing through the center of the axle 125 and the center of the input shaft 116 to the compound sheaves 117. In the intermediate or in line position the sheave members of the compound sheaves 117 are positioned for the transmission of a minimum torque to the wheels 112 and 113. In this position the grooves 162 and 163 are at their maximum pitch diameter and the compound sheaves and the wheels may be driven in either direction. On the application of a torque to the wheels 112 and 113 the coupling mechanisms 114 and 115 will shift either in direction C or direction D, depending upon the direction of rotation of the compound sheaves 117. When the wheels 112 and 113 are rotated in direction $D_1$, the coupling mechanisms 114 and 115 tend to rotate in the direction D from the intermediate position, and when the wheels are driven in the direction $C_1$, the coupling mechanisms 114 and 115 tend to rotate in the direction C from the intermediate position.

When the wheels 112 and 113 are rotated in the direction $D_1$, the coupling mechanisms 114 and 115 will be rotated about the axle 125 by the chains and sprockets and the belts 129 and 133 will be pulled down into the grooves 162 and 163 to lessen the pitch diameter. A further increase in torque will move the coupling mechanisms further from the intermediate position in direction D. On a lessening in torque the coupling mechanisms move toward the intermediate position. If a turn is made, the coupling mechanisms 114 and 115 and the compound sheaves 117 will respond in a similar manner, as described in connection with the previous embodiment. For example, if a turn is made so that wheel 112 has a shorter distance to travel than wheel 113, the torque applied to wheel 112 increases, rotating the coupling mechanism 114 further in direction D to reduce the speed of wheel 112 by decreasing the pitch diameter of the groove 162. The wheel 113 will have a reduced torque and the coupling mechanism 115 will rotate in direction C towards the intermediate position, increasing the speed of wheel 113 since the pitch diameter of groove 163 increases.

When the wheels 112 and 113 are rotated in an opposite direction by means of the drive mechanism, the coupling mechanisms tend to move in direction C. On an increase in torque the coupling mechanisms move further from the intermediate position and on a decrease in torque the respective coupling mechanisms move towards the intermediate position or in direction D. Thus, the variation in torque applied to the wheels causes the coupling mechanisms to respond in a similar manner as on the opposite rotation of the wheels 112 and 113. When the torque of wheel 112 is increased on a turn, the coupling mechanism 114 moves in direction C to decrease the speed of rotation of the wheel. The coupling mechanism 115 shifts in direction D, increasing the speed of the wheel 113.

In this latter embodiment no stop means are necessary to limit the movement of the coupling mechanisms in the direction of decreasing torque. On either side of the intermediate position a balance is reached between the stud gears under the pressure of the rotational torque and the pressure of the spring means 121 on the sheave members of the compound sheave.

The shaft 116 may be coupled to any suitable speed control transmission which drives the shaft in either direction and attains a full differential action for either direction of rotation. For example, the control mechanism 11 may be connected to the shaft 116 with a range of speed control covering the direction of rotation which will drive the wheels in a normally forward direction. Thus, with the rotation of the wheels 112 and 113 in direction $D_1$, the coupling mechanisms move in direction D from the intermediate position on an increase in torque. When the wheels are to be driven in reverse, the control mechanism is operated so that the extended rim 92 engages with the circumferential V-shaped groove 93 to reverse the direction of rotation of the shaft 116. Under such conditions the coupling mechanisms 114 and 115 will swing back through the intermediate position in direction C.

In illustrating the embodiment shown in Figs. 14–18 the line through the centers of the compound sheaves and the axle has been shown perpendicular to the surface of travel. This is for the purpose of illustration and description and it is understood that the line through the compound sheaves and the axle may be at an angle other than the perpendicular. In each of the embodiments the spring 21 or 121 may be omitted and the differential action will still be secured. The compound sheaves 117 will be swung in either direction C or D, depending on the torque applied to the coupling mechanisms 114 and 115. On a reversal of torque the coupling mechanisms will be correspondingly shifted to the other side. Also, various types of drives may be used to secure the same functional results. For example, instead of chains and sprockets, direct gearing may be used between the gears on the jackshafts and the wheel gears.

Figure 18:
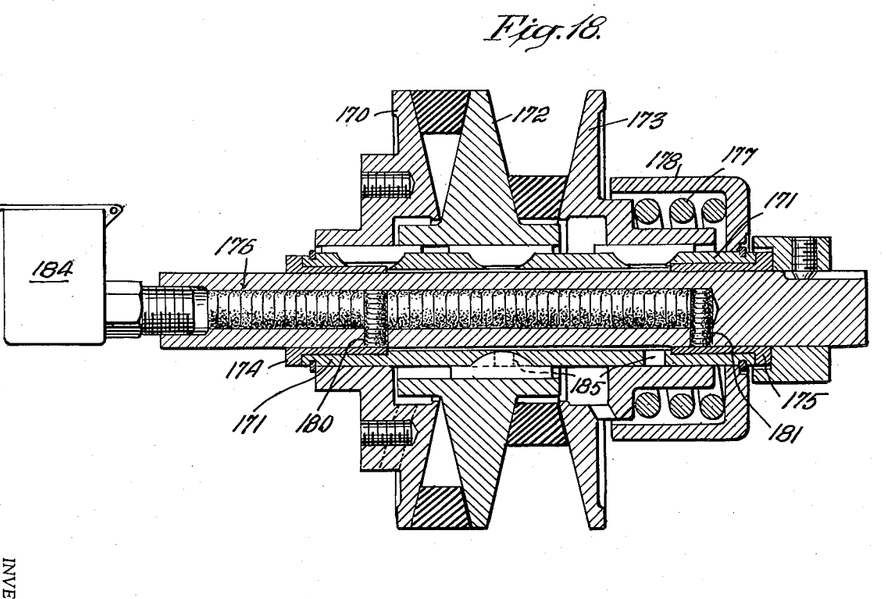
Fig. 18 is a detailed sectional view of the compound sheaves, particularly the compound sheaves of the control mechanism.

In Fig. 18 a detailed sectional view of a compound sheave is shown. In this sheave the sheave member 170 is axially fixed on a bronze sleeve 171 and the sheaves 172 and 173 are slideably mounted thereon and keyed to rotate with the sleeve. The sleeve 171 is rotatably mounted on sleeve bearings 174 and 175 at opposite ends of the bronze sleeve. The bronze sleeve is mounted on a steel supporting shaft which has a bore 176 for lubricating the bearings 174 and 175

As in the compound sheaves in the foregoing embodiments, the slideable end sheave 173 is pressed towards the fixed sheave 170 by spring means 177 seated in a cup shaped flange 178 secured to the bronze sleeve. The bore 176 has passages 180 and 181 connecting the bore to the bearings. The bore and passages are filled with a felt wick and supplied with lubricating oil from an oil cup 184. The felt feeds the oil to the non-pressure side of the bearings. The heat of operation causes the oil to slowly feed into the sleeve bearings. The centrifugal force throws the oil out of each of the end bearings. The bronze sleeve 171 is spaced from the steel shaft to form an annular relief cavity into which the oil flows. The oil then flows through the holes 185 through the bronze shaft to lubricate the sliding fits of the sheave members 172 and 173. The end sheave members form an annular cavity in which the intermediate floating sheave member fits and is discharged through relief orifices in the sheave members. The intermediate member divides the annular relief cavity into two parts which serve as collector spaces for the oil that is bled off through the relief orifices in the hubs of the end sheave members. This provides a continuous and adequate lubrication of the rotating and sliding parts to ensure long wear of the compound sheaves.

In the foregoing description a particular structure has been shown to illustrate the invention. It is not intended to limit the invention to these specific embodiments. Various changes and modifications may be made without departing from the scope of the invention as set forth in the appended claims.

I claim:

1. A differential drive mechanism for coupling rotatably supported traction wheels to a power source and comprising two rotatably supported driven means coupled to rotatably supported traction wheels, coupling means for driving a respective driven means, means for rotatably mounting each of said coupling means to move through an arc about the axis of rotation of a respective driven means in response to the variation in torque applied to a respective driven means, and variable speed driving means separately coupled to each of said coupling means to vary the speed of a respective traction means inversely to the torque of said traction means.

2. A differential drive mechanism for coupling rotatably supported traction wheels to a power source and comprising coupling means for driving a respective wheel, means rotatably mounting said coupling means to move through an arc about the axis of rotation of a respective wheel for independently driving a respective wheel, and variable speed driving means coupled to said coupling mechanisms for varying the speed of said coupling mechanisms inversely to the torque applied to a respective wheel.

3. A differential drive mechanism for coupling rotatably supported traction wheels to a power source and comprising two coupling mechanisms, means mounting said coupling means to rotate about the axis of a respective wheel, means for coupling each of said coupling mechanisms with a respective wheel to drive a respective wheel and to rotate said coupling mechanisms about the axis of a respective wheel in response to an increase of applied torque to a respective wheel, and variable speed driving means coupled to said coupling means for varying the speed of said coupling means inversely to the variations in torque and having resilient means for rotating said coupling means on a decrease in torque.

4. A differential drive mechanism for coupling rotatably supported traction wheels to a power source and comprising two coupling mechanisms rotatably mounted to turn about the axis of a respective wheel, a variable speed means spaced from the axis of said wheels, said coupling mechanism positioned between said variable speed mechanism and said axis and coupled to said variable speed means to vary the speed of rotation of a respective coupling mechanism on rotation about said axis in response to variations in torque, said coupling mechanism positioned between said variable speed mechanism and said axis and rotatable to one side of said intermediate position on rotation of said variable speed mechanism in one direction and rotatable to the other side of said intermediate position on rotation of said variable speed mechanism in the opposite direction.

5. A differential drive mechanism for coupling rotatably supported wheels to a power source comprising wheel sprockets mounted on a respective wheel, two coupling mechanisms pivotally mounted to rotate about the axis of a respective wheel, means for coupling each of said coupling mechanisms with a respective wheel sprocket to remain in driving relation on pivoting of said mechanism, compound sheaves having spring loaded sheaves forming two variable pitch diameter V-shaped grooves, fixed sheaves on respective coupling mechanisms and V-belts coupling a respective fixed sheave with a respective variable pitch diameter groove, said compound sheave positioned so that said fixed sheaves move to and from said compound sheaves on an increase and decrease in torque to vary the speed of said wheels.

6. A differential drive mechanism comprising two drive wheels, an axle for rotatably supporting said wheels, wheel sprockets rigidly connected to a respective wheel and rotating therewith, two coupling mechanisms pivotally mounted to rotate about said axle, each having a fixed sheave at one end and a sprocket gear at the other end, each of said sprocket gears being connected by a respective chain to a respective wheel sprocket to drive a respective wheel, an input power drive shaft for supplying power to the differential drive, a compound sheave having a fixed end sheave member, an intermediate sheave member and a movable end sheave member mounted on and rotatable with said shaft, said intermediate and moveable sheave member being slideably mounted in said shaft and forming two V-shaped belt grooves having variable pitch diameters, V-belts fitting on a respective fixed sheave and in a respective groove of said compound sheaves, a spring pressing against said axially slideable end sheave to force said sheave members together to increase the pitch diameter of the grooves, said coupling mechanisms rotating about the axle in a direction from said compound sheaves on an increase in torque to the respective wheel and rotating in a direction towards said compound sheaves on a lessening of torque to a respective wheel to independently vary the relative speeds of the wheels.

7. A differential drive mechanism as set forth in claim 2 wherein a variable speed control mechanism is connected to said compound sheaves to drive said compound sheaves over a range of speeds and to reverse the direction of rotation of said compound sheaves.

8. A differential drive mechanism as set forth in claim 7 wherein said control mechanism comprises a fixed driven sheave and a fixed driving engine sheave and a second compound sheave pivotally mounted between said fixed sheaves with the pivot point substantially in line with the centers of rotation of the fixed sheaves, said driving sheave and said compound sheaves having means for engaging to reverse the rotation of said compound sheaves.

9. In a V-belt drive the combination of a driven member having an axis, an arm pivotally mounted on said axis, a rotatable element mounted for rotation about a second axis carried by said arm spaced from said first axis, said element having a driving connection with said member tending to drive said member in one direction and swing said arm about said first axis in an opposite direction, a V-belt pulley rotatably mounted on said second axis and drivably connected to said rotatable element, a V-belt drivably engaging said pulley, a driving pulley engaging said belt and mounted on a third axis, said second axis being free to move away from alignment with said first and third axes to relate said belt and said arm angularly and tighten said belt by the said swinging of said arm.

10. In a V-belt drive the combination of a driven member having an axis, an arm pivotally mounted on said axis, a rotatable element mounted for rotation about a second axis carried by said arm spaced from said first axis, said element having a driving connection with said member tending to drive said member in one direction and swing said arm about said first axis in an opposite direction, a V-belt pulley suitably mounted on said second axis and drivably connected to said rotatable element, a V-belt drivably engaging said pulley, a driving pulley engaging said belt and mounted on a third axis, said arm and said belt being angularly related, and said second axis being free to move with respect to said third axis to decrease the angle between said arm and said belt and tighten said belt by swinging said arm.

11. The V-belt drive of claim 10 having stop means to prevent said arm from swinging toward said third axis whereby to increase the angle between said arm and said belt and to remove said belt from driving engagement by the swing of said arm.

12. A differential drive mechanism for coupling rotatably supported traction wheels to a power source and comprising first and second rotatably supported power transferring means coupled to a respective traction wheel to transmit driving torque to a respective traction wheel, a variable speed driving means for varying the speed of rotation of said traction wheels and having a reaction force urging said variable speed driving means into a high speed ratio for driving the wheels at a greater speed, said variable speed driving means including a compound sheave pulley with an intermediate member axially slideable for varying the pitch diameters of the compound sheave, first and second pulleys and first and second belts separately coupling said first and second pulleys respectively to said compound sheave pulley over a range of speeds, said first and second pulleys separately connected to said first and second power transferring means in a variable speed relation with said compound sheave pulley, each of said rotatably supported power transferring means mechanically including as part of and mounted on the power transferring means a respective torque-responsive force transmitting means positively connected to a respective pulley and to a respective traction wheel for balancing the torque of said power transferring means and the reaction force of said variable speed means for adjusting the speed ratio of said variable speed means in direct response to the driving torque so that the speed of the respective traction wheels differentially varies in response to changes in torque applied to either wheel.

References Cited in the file of this patent
UNITED STATES PATENTS

| | | |
|---|---|---|
| 625,772 | Joel | May 30, 1899 |
| 2,420,100 | Salsbury | May 6, 1947 |
| 2,780,107 | Sorrell | Feb. 5, 1957 |